No. 735,908. Patented August 11, 1903.

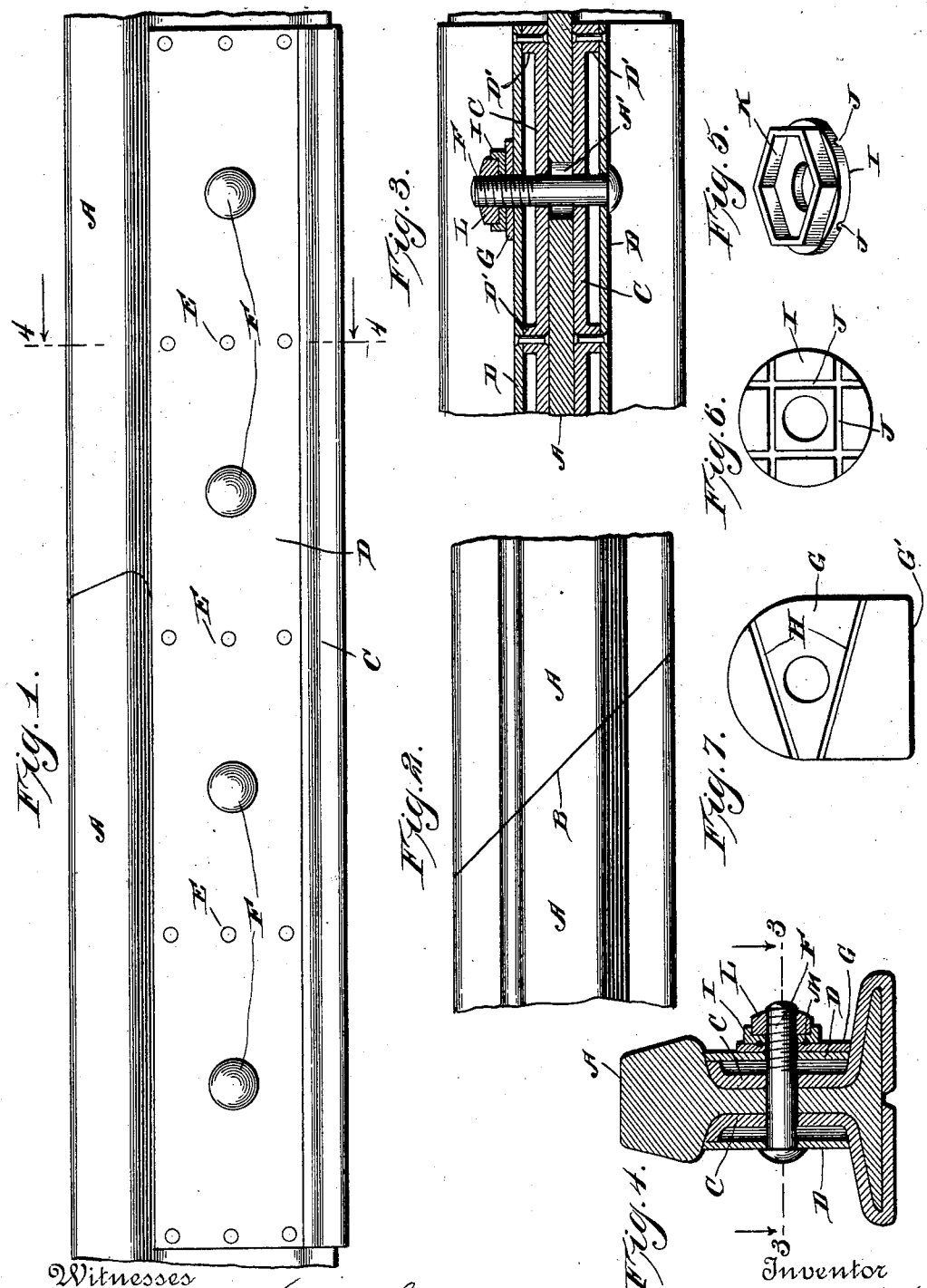

UNITED STATES PATENT OFFICE.

LUCIUS N. REED, OF FULTON, ILLINOIS.

COMBINED RAIL-JOINT AND NUT-LOCK.

SPECIFICATION forming part of Letters Patent No. 735,908, dated August 11, 1903.

Application filed May 29, 1902. Serial No. 109,464. (No model.)

*To all whom it may concern:*

Be it known that I, LUCIUS N. REED, a citizen of the United States, residing at Fulton, county of Whiteside, and State of Illinois, have invented a certain new and useful Improvement in a Combined Rail-Joint and Nut-Lock, of which the following is a specification.

My invention relates to a new and useful improvement in combined rail-joints and nut-locks, and has for its object to provide an improved rail-joint constructed in such a manner that it will present practically a continuous rail, and the joint will be provided with a flexible fish-plate upon each side, so as to take up the expansion and contraction; and a further object of my invention is to provide an improved manner of locking the nuts to prevent them from becoming loosened by vibration or any other cause.

With these ends in view this invention consists in the details of construction and combination of elements hereinafter set forth and then specifically designated by the claim.

In order that those skilled in the art to which this invention appertains may understand how to make and use the same, the construction and operation will now be described in detail, referring to the accompanying drawings, forming a part of this specification, in which—

Figure 1 is a side elevation of a portion of two rails, showing the same joined with my improved apparatus; Fig. 2, a plan view of the rail, showing the manner of cutting the same; Fig. 3, a longitudinal section on the line 3 3 of Fig. 4; Fig. 4, a cross-section through the rail and fish-plate on the line 4 4 of Fig. 1; Fig. 5, a perspective view of the recessed washer; Fig. 6, a rear view of the recessed washer; Fig. 7, a face view of the stationary washer.

In the drawings, A represents the rails, the ends of which are cut upon a bevel, as indicated at B, so that when the two rails are joined together abutting one another they will not present to the tread of the wheel any abrupt joint; but the wheel may be in contact with both rails at the same time. Therefore when the two rails are joined together they virtually make one continuous rail. Upon each side of the rail are arranged the fish-plates C, which come in close contact with the web of the rail upon each side and also pass around and underneath the flange of the rail, as shown in Fig. 4, and upon each of the fish-plates are secured the spring-strips D, which strips are riveted to vertical ribs D', formed on the fish-plates at each end and also in between each of the bolts, as indicated at E.

F represents ordinary bolts headed at one end and which pass through holes provided through the spring-strips, through the fish-plates, and also through the web of the rail; but before the nut is threaded upon the end of the bolt a stationary washer G is slipped over the bolt, and this washer has a flat surface G' at its lower end, which coming in contact with the fish-plate where it passes above the flange of the rail will hold the washer G against turning. Upon the outer face of the washer G are formed a series of grooves H, and there may be as many of these grooves as desired.

I is a movable washer adapted to be slipped over the end of the bolt F after the washer G. The inner face of this washer is provided with a series of tangential grooves J, and there may be as many of these grooves as desired. The outer face of the washer I is recessed, as indicated at K, and this recess is made in the form of the nut to be threaded upon the end of the bolt F. Thus when the joint is to be made the nut L is placed within the recess K of the washer I, and then the nut, with the washer, is threaded upon the end of the bolt, so as to bring the washer I in tight contact with the stationary washer G, and when the nut is tightened to the desired point it is then turned slightly, so as to bring one of the grooves J in alinement with one of the grooves H, and when the two grooves are brought thus in alinement a circular opening or hole will be formed, through which is passed a pin M, which will thus prevent the two washers I and G from turning relative to one another, and as the washer I holds the nut L stationary this nut cannot become loosened from the bolt, and when it is necessary to either tighten the nut upon the bolt or remove the nut entirely the pin may be withdrawn and again inserted when desired. To prevent the pin from being accidentally displaced, it may be long enough to pass entirely through the opening formed by the grooves and bent slightly upon each end.

The advantage of my invention is that by the use of the spring-strip upon each side of the fish-plate the flexibility of this strip will take up all of the expansion and contraction of the rails, and by cutting the rails upon a bevel the jarring of the train in passing over the joint of ordinary rails will be done away with, and the effect will be the same as if the whole track was one continuous rail, and by the use of my improved nut-lock the joints will not have to be inspected, as they are now, as the nuts can never become loosened through vibration, and the only tension they will require is to be tightened from time to time at longer intervals to take up the wear upon the parts.

The bolt-holes A', formed through the web of the rails, are slightly elongated to allow for expansion and contraction of the rails.

Of course I do not wish to be limited to the exact construction here shown, as slight modifications could be made without departing from the spirit of my invention.

Having thus fully described my invention, what I claim as new and useful is—

In a rail-joint and nut-lock, two rails, fish-plates having their upper portions flanged outward and having the edges of the upper portions lying approximately parallel with the vertically-disposed portions of the plates, ribs on the fish-plates having their outer surfaces on the planes of the upper edges of the said plates, resilient plates resting against the surfaces of the ribs and the upper edges of the plates and suitable bolts, nuts and washer, as and for the purpose described.

In testimony whereof I have hereunto affixed my signature in the presence of two subscribing witnesses.

LUCIUS N. REED.

Witnesses:
JUSTIN P. KNIGHT,
JOHN NANIGA.